US012611869B2

(12) United States Patent
Otana

(10) Patent No.: US 12,611,869 B2
(45) Date of Patent: Apr. 28, 2026

(54) INKJET RECORDING APPARATUS

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 190 days.

(21) Appl. No.: 18/760,879

(22) Filed: Jul. 1, 2024

(65) Prior Publication Data

US 2025/0010619 A1 Jan. 9, 2025

(30) Foreign Application Priority Data

Jul. 6, 2023 (JP) ................................ 2023-111355

(51) Int. Cl.
*B41J 2/17* (2006.01)
*B41J 2/165* (2006.01)

(52) U.S. Cl.
CPC ......... *B41J 2/1721* (2013.01); *B41J 2/16508* (2013.01); *B41J 2/16523* (2013.01); *B41J 2/1714* (2013.01); *B41J 2/1728* (2024.05); *B41J 2/1742* (2024.05)

(58) Field of Classification Search
CPC .. B41J 2/16508; B41J 2/16523; B41J 2/1714; B41J 2/1721; B41J 2/1728; B41J 2/1742
See application file for complete search history.

(56) References Cited

U.S. PATENT DOCUMENTS 7,661,790 B2 * 2/2010 Harada ............... B41J 2/16517 347/29

FOREIGN PATENT DOCUMENTS

JP H 06-340092 A 12/1994

* cited by examiner

*Primary Examiner* — Geoffrey S Mruk
(74) *Attorney, Agent, or Firm* — Stein IP, LLC

(57) ABSTRACT

A waste ink container includes: a side wall section surrounding a reservoir region; a plurality of receiving openings for receiving ink; a suction opening connected to a suction mechanism; an absorbing member that absorbs the ink; and a plurality of suction air passages defined by space in the reservoir region where the absorbing member is absent, connected to each of the plurality of receiving openings, and forming communication between the receiving opening as a connection destination and the suction opening to cause a suction airflow to pass therethrough generated in response to driving of the suction mechanism. A certain portion of at least one of the suction air passages is defined by space sandwiched between an air passage doubling portion forming a part of the side wall section and the absorbing member.

3 Claims, 10 Drawing Sheets

INKJET RECORDING APPARATUS

INCORPORATION BY REFERENCE

This application is based on and claims the benefit of priority from Japanese Patent Application No. 2023-111355 filed on Jul. 6, 2023, the contents of which are hereby incorporated by reference.

BACKGROUND

The present disclosure relates to an inkjet recording apparatus.

A conventional inkjet recording apparatus is mounted with a waste ink container to store ink to be disposed of.

The waste ink container is connected to a suction mechanism. The suction mechanism sucks gas from the waste ink container. The gas sucked by the suction mechanism flows through an air passage formed inside the waste ink container. The gas contains ink in a mist form.

SUMMARY

An inkjet recording apparatus of the present disclosure comprises a recording head, a waste ink container, and a suction mechanism. The recording head records an image by discharging ink to a recording medium being conveyed. The waste ink container is located in such a manner as to face the recording head in a certain direction across a conveyance path of the recording medium, has a reservoir region therein, and stores the ink in the reservoir region. The stored ink is discharged from the recording head and not to be used for recording of the image. The suction mechanism sucks gas from the waste ink container. The waste ink container has a side wall section, a plurality of receiving openings, a suction opening, an absorbing member, and a plurality of suction air passages. The side wall section surrounds the reservoir region from a direction perpendicular to the certain direction. The plurality of receiving openings receives the ink discharged from the recording head. The suction opening is located at a position spaced at an interval from each of the plurality of receiving openings as viewed from the certain direction and connected to the suction mechanism. The absorbing member is located in the reservoir region and absorbs the ink. The plurality of suction air passages is defined by space in the reservoir region where the absorbing member is absent, is connected to each of the plurality of receiving openings, and forms communication between the receiving opening as a connection destination and the suction opening to cause a suction airflow to pass therethrough generated in response to driving of the suction mechanism. A certain portion of at least one of the suction air passages is defined by space sandwiched between an air passage doubling portion forming a part of the side wall section and the absorbing member.

DETAILED DESCRIPTION

The following describes an inkjet recording apparatus according to one embodiment of the present disclosure by referring to FIGS. 1 to 9 by taking a printer 100 as an example. The printer 100 is installed on a flat floor surface and used in this state. In the following description, a direction vertical to the flat floor surface on which the printer 100 is installed will be defined as a top-bottom direction.

The printer 100 records (namely, prints) an image on a sheet S as a recording medium. Paper is mainly used as the sheet S. The sheet S of a different type such as an OHP sheet is also available. Alternatively, cloth or cardboard is also available.

<Configuration of Printer>

Figure 1:
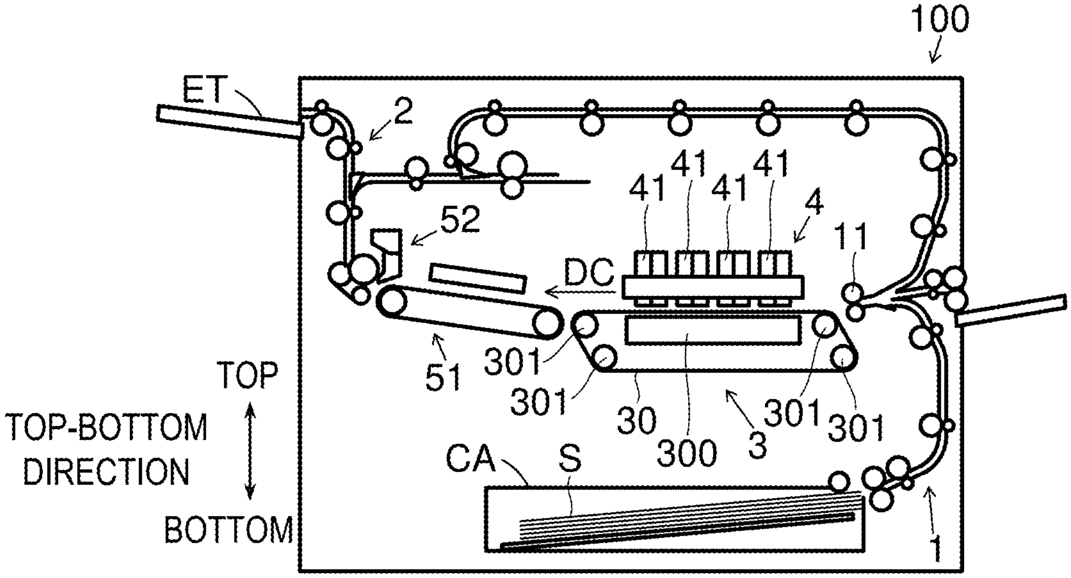
FIG. 1 is an outline view of an inkjet recording apparatus according to one embodiment.

As shown in FIG. 1, the printer 100 of the present embodiment (corresponding to the “inkjet recording apparatus”) comprises a first conveyance part 1 and a second conveyance part 2. The first conveyance part 1 feeds the sheet S (corresponding to the “recording medium”) placed on a sheet feed cassette CA and conveys the sheet S toward a recording position. A print job implemented by the printer 100 is to record (print) an image on the sheet S passing through the recording position. The second conveyance part 2 conveys the recorded sheet S. The second conveyance part 2 ejects the recorded sheet S to an ejection tray ET.

The first conveyance part 1 comprises a plurality of conveyance roller members including a registration roller pair 11. In FIG. 1, a sign is given only to the registration roller pair 11 of the plurality of conveyance roller members. Each of the plurality of conveyance roller members rotates to convey the sheet S. The registration roller pair 11 includes rollers in a pair contacting each other under pressure. A registration nip is formed between the rollers in a pair. The sheet S fed from the sheet feed cassette CA enters the registration nip. The registration roller pair 11 rotates to convey the sheet S having entered the registration nip toward a belt conveyance part 3 described later.

At a moment when a front edge of the sheet S arrives at the registration nip, the registration roller pair 11 stops rotating. Meanwhile, the conveyance roller members upstream from the registration roller pair 11 in a conveyance direction DC of the sheet S rotate. By doing so, oblique running of the sheet S is corrected.

The printer 100 comprises the belt conveyance part 3. The belt conveyance part 3 receives the sheet S from the first conveyance part 1 and conveys the received sheet S. The belt conveyance part 3 comprises a conveyance belt 30. The conveyance belt 30 has an endless shape and is supported rotatably. The belt conveyance part 3 comprises a plurality of suspension rollers 301. The plurality of suspension rollers 301 are supported rotatably. The conveyance belt 30 is suspend on the plurality of suspension rollers 301 to rotate. The sheet S conveyed from the first conveyance part 1 reaches an outer peripheral surface of the conveyance belt 30.

One of the plurality of suspension rollers 301 is coupled to a belt motor (not shown in the drawings), and rotates in response to transmission of driving force from the belt motor. The rotation of the suspension roller 301 coupled to the belt motor drives the conveyance belt 30 to rotate. At this time, the other suspension rollers 301 are also driven to rotate.

The belt conveyance part 3 includes a suction unit 300. The suction unit 300 is located on an inner peripheral side of the conveyance belt 30. The suction unit 300 sucks the sheet S on the outer peripheral surface of the conveyance belt 30.

Specifically, the conveyance belt 30 has a plurality of suction holes (not shown in the drawings). The suction holes of the conveyance belt 30 penetrate the conveyance belt 30 in a thickness direction thereof. The suction unit 300 sucks the sheet S via the suction holes of the conveyance belt 30. By doing so, the sheet S is sucked on the outer peripheral surface of the conveyance belt 30. The conveyance belt 30 rotates while holding the sheet S under suction on the outer peripheral surface thereof. As a result, the sheet S is conveyed. In other words, the conveyance belt 30 conveys the sheet S while sucking the sheet S on the outer peripheral surface thereof.

The printer 100 includes a recording part 4. The recording part 4 is located in such a manner as to face the outer peripheral surface of the conveyance belt 30 in the top-bottom direction. During conveyance of the sheet S, the sheet S on the outer peripheral surface of the conveyance belt 30 and the recording part 4 face each other with an interval therebetween in the top-bottom direction. By doing so, during conveyance of the sheet S, the sheet S passes through between a nozzle surface of a recording head 40 described later and the outer peripheral surface of the conveyance belt 30. In other words, a part of a conveyance path of the sheet S is formed between the nozzle surface of the recording head 40 and the outer peripheral surface of the conveyance belt 30. In this configuration, the conveyance direction DC of the sheet S being conveyed by the conveyance belt 30 conforms to a horizontal direction.

Figure 2:
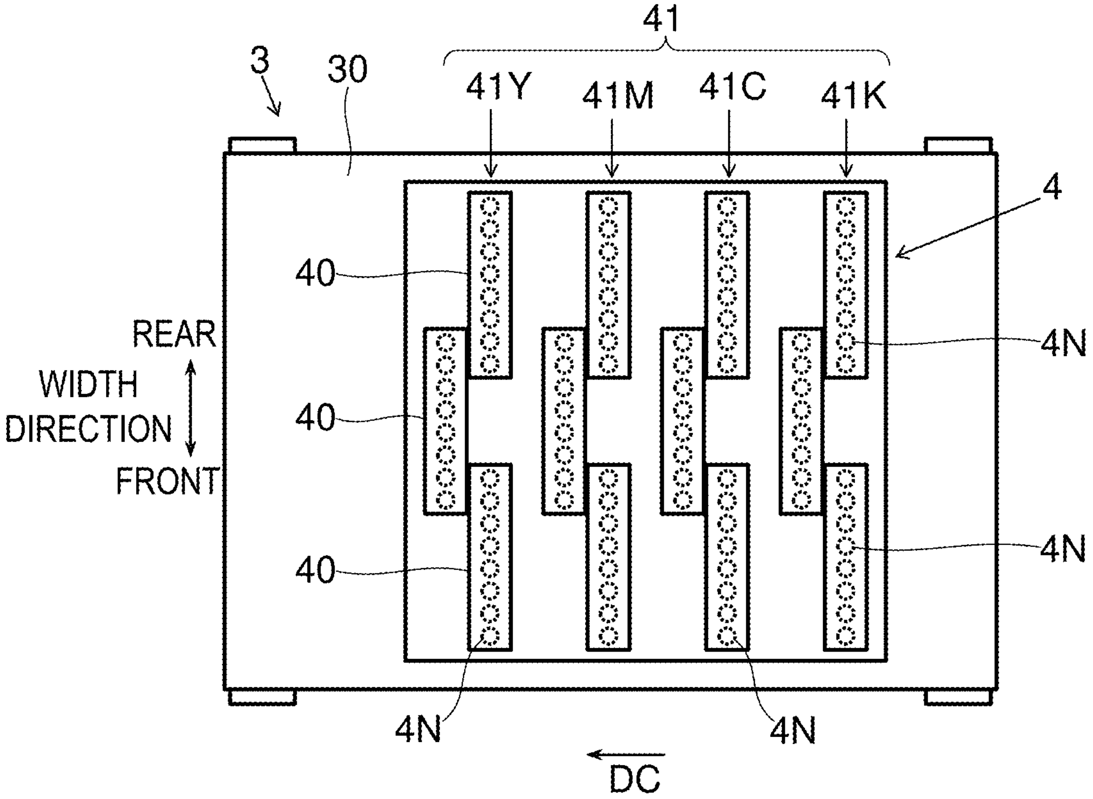
FIG. 2 is a plan view of a recording part of the inkjet recording apparatus according to one embodiment.

As shown in FIG. 2, the recording part 4 includes four line heads 41 corresponding to respective colors of cyan, magenta, yellow, and black. In FIG. 2, the line heads 41 are distinguished from each other by giving a sign "C" to the line head 41 for cyan, a sign "M" to the line head 41 for magenta, a sign "Y" to the line head 41 for yellow, and a sign "K" to the line head 41 for black. This also applies to FIG. 5 referred to in the following description.

The four line heads 41 have a plurality of (for example, three) recording heads 40. For example, the plurality of recording heads 40 for a respective color are arranged in a staggered pattern in a direction perpendicular to the conveyance direction DC in which the sheet S is conveyed by the conveyance belt 30. In the following description, the direction perpendicular to the conveyance direction DC in which the sheet S is conveyed by the conveyance belt 30 may be called a width direction simply.

Each of the four line heads 41 extends in the width direction as a long-side direction thereof as viewed from the top-bottom direction. The four line heads 41 are spaced at intervals from each other in the conveyance direction DC of the sheet S.

Each recording head 40 is spaced at an interval from the outer peripheral surface of the conveyance belt 30 in the top-bottom direction. In other words, each recording head 40 is located at a position facing the sheet S in the top-bottom direction conveyed by the conveyance belt 30. In still other words, the conveyance belt 30 conveys the sheet S while sucking the sheet S thereon under each recording head 40. The top-bottom direction is a direction perpendicular to the conveyance direction DC in which the sheet S is conveyed by the conveyance belt 30 and perpendicular to the width direction.

Each recording head 40 has a surface facing the outer peripheral surface of the conveyance belt 30 in the top-bottom direction and having as the nozzle surface. The nozzle surface of each recording head 40 has a plurality of nozzles 4N. The plurality of nozzles 4N of each recording head 40 are used for discharging ink of a corresponding color downward. For example, the number of the nozzles 4N of each recording head 40 is same. These nozzles 4N of each recording head 40 are arranged along the width direction of the conveyance belt 30. In FIG. 2, the nozzles 4N are represented by dashed lines. Note that a larger number of the nozzles 4N are actually provided at each recording head 40. For the sake of convenience, only some of the nozzles 4N are given signs.

Each recording head 40 discharges ink from the nozzles 4N toward the sheet S on the outer peripheral surface of the conveyance belt 30 on the basis of image data to be recorded on the sheet S according to a print job. The ink discharged from each recording head 40 adheres to the sheet S. By doing so, an image is recorded on the sheet S. In other words, a recording position is defined between each recording head 40 and the conveyance belt 30, and the image is recorded on the sheet S at the recording position.

The viscosity of ink remaining at the nozzle 4N of the plurality of nozzles 4N from which the ink is discharged not frequently is increased with time. As a result, clogging occurs to reduce image quality. To reduce the occurrence of such inconvenience, each recording head 40 performs a flushing process. In the flushing process by each recording head 40, ink remaining at the nozzle 4N is discharged. By doing so, the occurrence of clogging is reduced. The flushing process will be described later in detail.

Referring back to FIG. 1, the printer 100 comprises a drying unit 51 and a decurler 52. While the drying unit 51 conveys the sheet S toward the decurler 52, the drying unit 51 dries ink adhering to the sheet S being conveyed. The decurler 52 corrects curl of the sheet S. The decurler 52 conveys the sheet S after subjected to the curl correction toward the second conveyance part 2.

Figure 3:
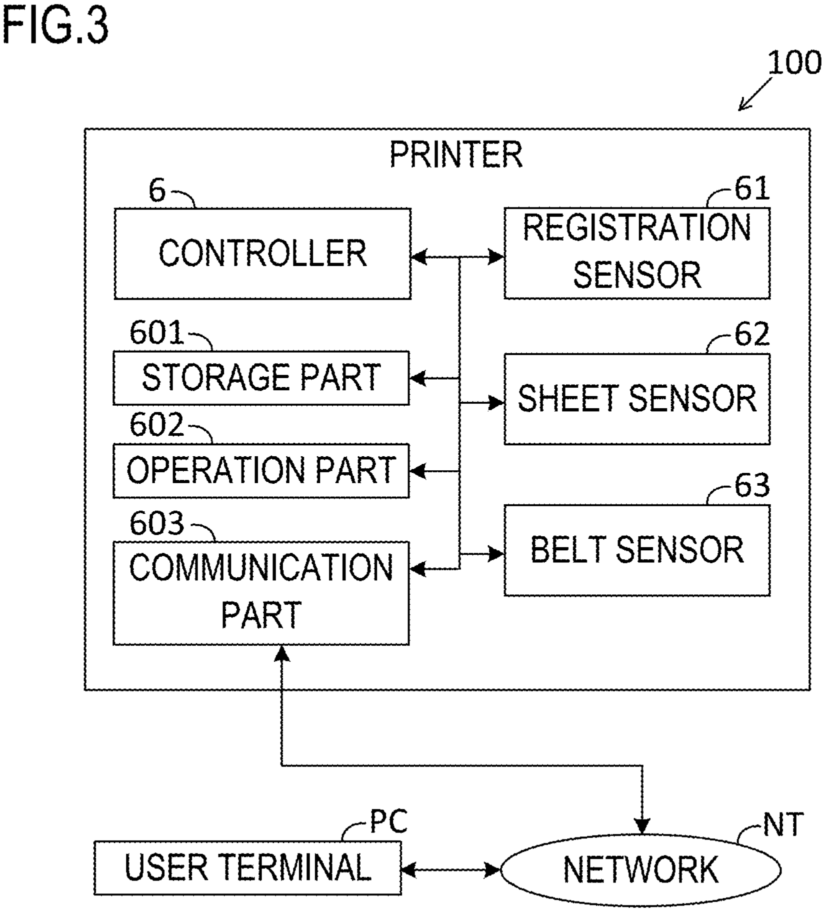
FIG. 3 is a block diagram of the inkjet recording apparatus according to one embodiment.

As shown in FIG. 3, the printer 100 comprises a controller 6. The controller 6 includes a processing circuit such as a CPU and an ASIC. The controller 6 controls a print job. In other words, the controller 6 controls each motion of the first conveyance part 1, the second conveyance part 2, the belt conveyance part 3, the recording part 4, the drying unit 51, and the decurler 52. In still other words, the controller 6 controls conveyance of the sheet S and discharge of ink by each recording head 40. The controller 6 controls the flushing process by each recording head 40.

A registration sensor 61, a sheet sensor 62, and a belt sensor 63 are connected to the controller 6. The controller 6 controls conveyance of the sheet S and image recording on the sheet S on the basis of output from each of the registration sensor 61, the sheet sensor 62, and the belt sensor 63.

The registration sensor 61 makes detection at a detecting position that is a position upstream from the registration nip in the conveyance direction DC of the sheet S. The registration sensor 61 is an optical sensor of a reflective or transmissive type, for example. The registration sensor 61 changes an output value in response to the presence or absence of the sheet S at the corresponding detecting position.

On the basis of the output value from the registration sensor 61, the controller 6 detects arrival of a front edge of the sheet S at the detecting position of the registration sensor 61 and passage of a rear edge of the sheet S through this detecting position. In other words, on the basis of the output value from the registration sensor 61, the controller 6 detects arrival of the front edge of the sheet S at the registration nip and passage of the rear edge of the sheet S through the registration nip. On the basis of time elapsed from when arrival of the front edge of the sheet S is detected at the detecting position of the registration sensor 61, the controller 6 determines timing of start of conveyance of the sheet S using the registration roller pair 11 (timing of start of rotation of the registration roller pair 11).

The sheet sensor 62 makes detection at a detecting position that is a position between the recording position of the line head 41 of the plurality of line heads 41 located most upstream in the conveyance direction DC of the sheet S and the registration nip. The sheet sensor 62 changes an output value in response to the presence or absence of the sheet S at the corresponding detecting position. A contact image sensor (CIS) is available as the sheet sensor 62. An optical sensor of a reflective or transmissive type is also available as the sheet sensor 62. The CIS sensor is used as the sheet sensor 62, for example.

On the basis of the output value from the sheet sensor 62, the controller 6 detects arrival of the front edge of the sheet S at the detecting position of the sheet sensor 62 and passage of the rear edge of the sheet S through this detecting position. On the basis of the output value from the sheet sensor 62, the controller 6 determines timing of discharge of ink to the sheet S conveyed by the conveyance belt 30. Note that the timing of discharge of the ink to the sheet S conveyed by the conveyance belt 30 may be determined on the basis of time elapsed from when conveyance of the sheet S by the registration roller pair 11 is started.

The controller 6 measures sheet transit time taken from when the front edge of the sheet S arrives at the detecting position of the sheet sensor 62 to when the rear edge of the same sheet S passes through the detecting position of the sheet sensor 62. The sheet transit time measured at the detecting position of the sheet sensor 62 changes in response to the size of the sheet S in the conveyance direction DC. Then, on the basis of the sheet transit time, the controller 6 recognizes the size of the sheet S in the conveyance direction DC conveyed by the conveyance belt 30. By doing so, even if the sheet S conveyed by the conveyance belt 30 has an indefinite size, it still becomes possible for the controller 6 to recognize the size of the sheet S in the conveyance direction DC.

The belt sensor 63 is a sensor for detecting a predetermined reference position (home position) of the conveyance belt 30. For example, a certain mark is provided at the reference position of the conveyance belt 30. This allows detection of the reference position of the conveyance belt 30 on the basis of an output value from the belt sensor 63. A CIS is available as the belt sensor 63. An optical sensor of a reflective or transmissive type is also available as the belt sensor 63.

On the basis of the output value from the belt sensor 63, the controller 6 detects the reference position of the conveyance belt 30. In other words, on the basis of the output value from the belt sensor 63, the controller 6 detects the position of a flushing region 31 (flushing hole 30*a*) described later.

The printer 100 comprises a storage part 601. The storage part 601 includes a storage device such as a ROM or a RAM. The storage part 601 is connected to the controller 6. The controller 6 reads information from the storage part 601. The controller 6 writes information into the storage part 601.

The printer 100 comprises an operation part 602. The operation part 602 includes a touch screen, for example. The touch screen displays software buttons, messages, etc., and accepts touching operation from a user. The operation part 602 is further provided with hardware buttons for accepting settings, instructions, etc. The operation part 602 is connected to the controller 6. The controller 6 controls display motion on the operation part 602 (touch screen). The controller 6 detects operation having been performed on the operation part 602.

The printer 100 comprises a communication part 603. The communication part 603 includes a communication circuit, etc. The communication part 603 is connected to a user terminal PC via a network NT. The user terminal PC is an information processor such as a personal computer. The controller 6 communicates with the user terminal PC using the communication part 603. For example, the user terminal PC transmits print data (such as PDL data) including image data to be recorded on the sheet S according to a print job to the printer 100. In other words, the user terminal PC transmits a request for execution of the print job to the printer 100. The print data according to the print job includes various types of setting data relating to printing such as the size of the sheet S to be used in the print job.

<Outline of Flushing Process>

Figure 4:
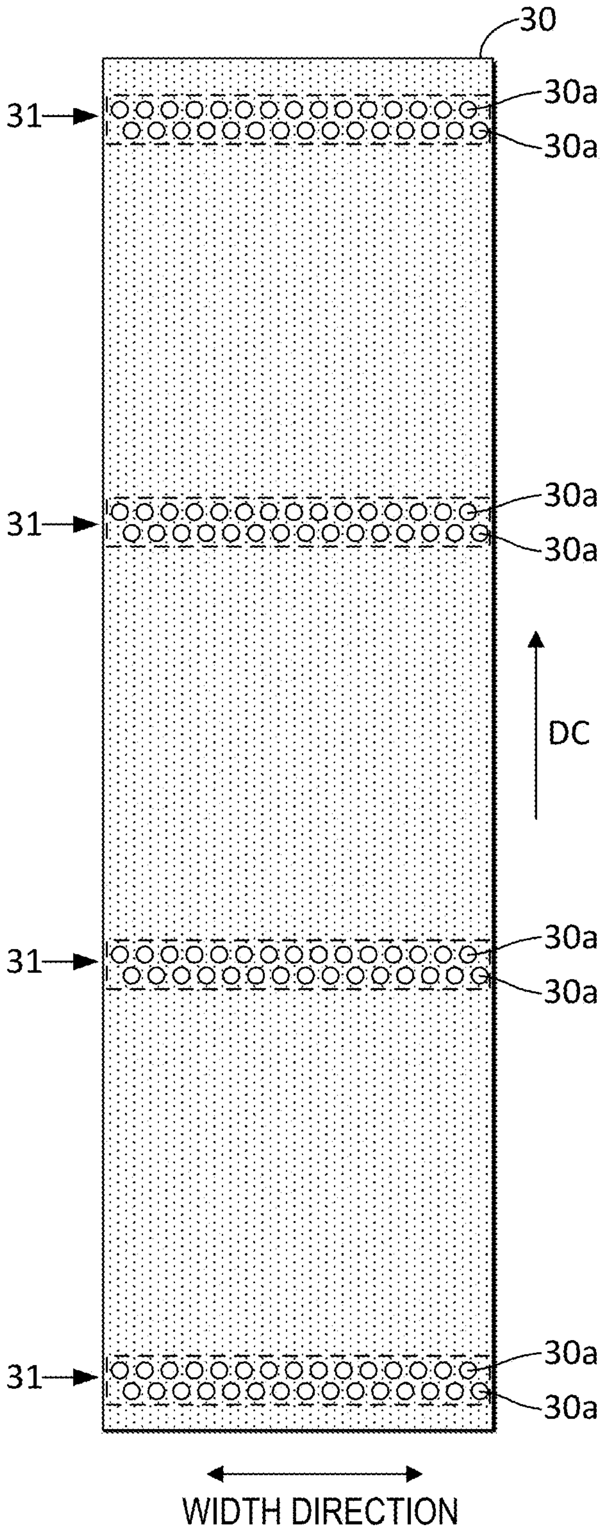
FIG. 4 is a plan view of a conveyance belt of the inkjet recording apparatus according to one embodiment.

As shown in FIG. 4, the conveyance belt 30 has the flushing region 31. In FIG. 4, the flushing region 31 is surrounded by dashed lines. The flushing region 31 is a region including the flushing hole 30*a* that is a through hole penetrating the conveyance belt 30 in the thickness direction thereof. The conveyance belt 30 is provided with a plurality of the flushing regions 31. The plurality of the flushing regions 31 are spaced at a certain interval from each other in a rotation direction of the conveyance belt 30 (the conveyance direction DC of the sheet S).

Each flushing region 31 includes a plurality of the flushing holes 30*a*. An opening shape of each flushing hole 30*a* (a shape viewed from the thickness direction of the conveyance belt 30) is not particularly limited. The shape of the flushing hole 30*a* may be a circular shape, an ellipsoidal shape, an oval shape, or a rectangular shape. In response to the rotation of the conveyance belt 30, each of the plurality of nozzles 4N comes to face at least any of the flushing holes 30*a* in the top-bottom direction.

A process of discharging ink from the nozzle 4N of each recording head 40 is performed as the flushing process. During implementation of the flushing process, the ink is discharged from each nozzle 4N with timing for the nozzle 4N to face the flushing hole 30*a* in the top-bottom direction. Then, the ink passes through the flushing hole 30*a*. This prevents the ink from adhering to the conveyance belt 30 despite implementation of the flushing process. In the following description, the ink discharged from each nozzle 4N during implementation of the flushing process will be called flushing ink to be distinguished from ink to contribute to image recording on the sheet S. The ink not to contribute to image recording on the sheet S is the flushing ink.

During implementation of a print job, the controller 6 controls the flushing process. Specifically, the controller 6 determines timing of start of conveyance of the sheet S from the registration roller pair 11 to the conveyance belt 30 in such a manner that the flushing region 31 appears in a constant cycle between sheets (in an interval between the rear edge of a preceding sheet S to the front edge of a subsequent sheet S). Then, the controller 6 causes discharge of ink from each nozzle 4N with timing of when this nozzle 4N faces the flushing hole 30*a* in the top-bottom direction not overlapping the sheet S. In other words, the controller 6 causes discharge of the ink from each nozzle 4N with timing different from timing of recording an image on the sheet S.

<Storage of Flushing Ink>

The flushing ink is stored in a body of the printer 100 (hereinafter called an apparatus body simply). If the amount of the stored flushing ink becomes a fixed amount, the flushing ink is disposed of.

Specifically, as shown in FIGS. 5 to 9, the printer 100 comprises a waste ink container 7 and a suction mechanism 10 connected to the waste ink container 7. The suction mechanism 10 sucks gas from the waste ink container 7.

During the flushing process, the flushing ink passes through the flushing hole 30*a* of the conveyance belt 30, the flushing ink is sucked by the function of the suction mechanism 10, and then the flushing ink reaches the waste ink container 7. The waste ink container 7 has a reservoir region therein. The waste ink container 7 stores the flushing ink in the reservoir region. As a result of suction by the suction mechanism 10, it becomes unlikely that mist of the flushing ink will go out of the waste ink container 7.

Two or more waste ink containers 7 are provided. The waste ink containers 7 are assigned one by one to each line head 41. In other words, the waste ink containers 7 are assigned one by one to each color of cyan, magenta, yellow, and black.

Each waste ink container 7 is mounted on the inner peripheral side of the conveyance belt 30 of the apparatus body. While each waste ink container 7 is mounted on the apparatus body, the waste ink container 7 is located below the recording head 40 to discharge ink of a corresponding color. Each waste ink container 7 is located in such a manner as to face the nozzle surface of the corresponding recording head 40 across the conveyance belt 30. In other words, each waste ink container 7 is located in such a manner as to face the line head 41 (each recording head 40 of this line head 41) to which the waste ink container 7 is assigned across the conveyance path of the sheet S in the top-bottom direction. By doing so, during implementation of the flushing process, the flushing ink passes through the flushing hole 30*a* and the flushing ink is stored in the reservoir region in each waste ink container 7. In this configuration, the top-bottom direction corresponds to a "certain direction."

Each waste ink container 7 is removably mounted on the apparatus body. Each waste ink container 7 can be removed from the apparatus body by being pulled out to the near side from an apparatus front of the printer 100 (frontward in the width direction). If the amount of the stored flushing ink becomes the fixed amount in any of the waste ink containers 7, this waste ink container 7 is removed from the apparatus body and is changed.

Figure 5:
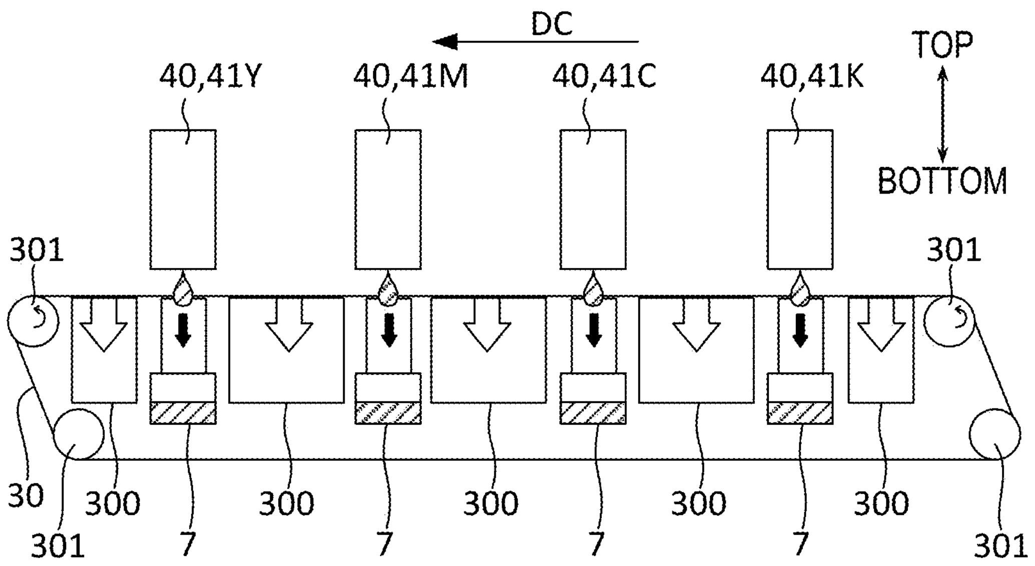
FIG. 5 is a schematic view of the conveyance belt and a periphery of the conveyance belt of the inkjet recording apparatus according to one embodiment.
Figure 6:
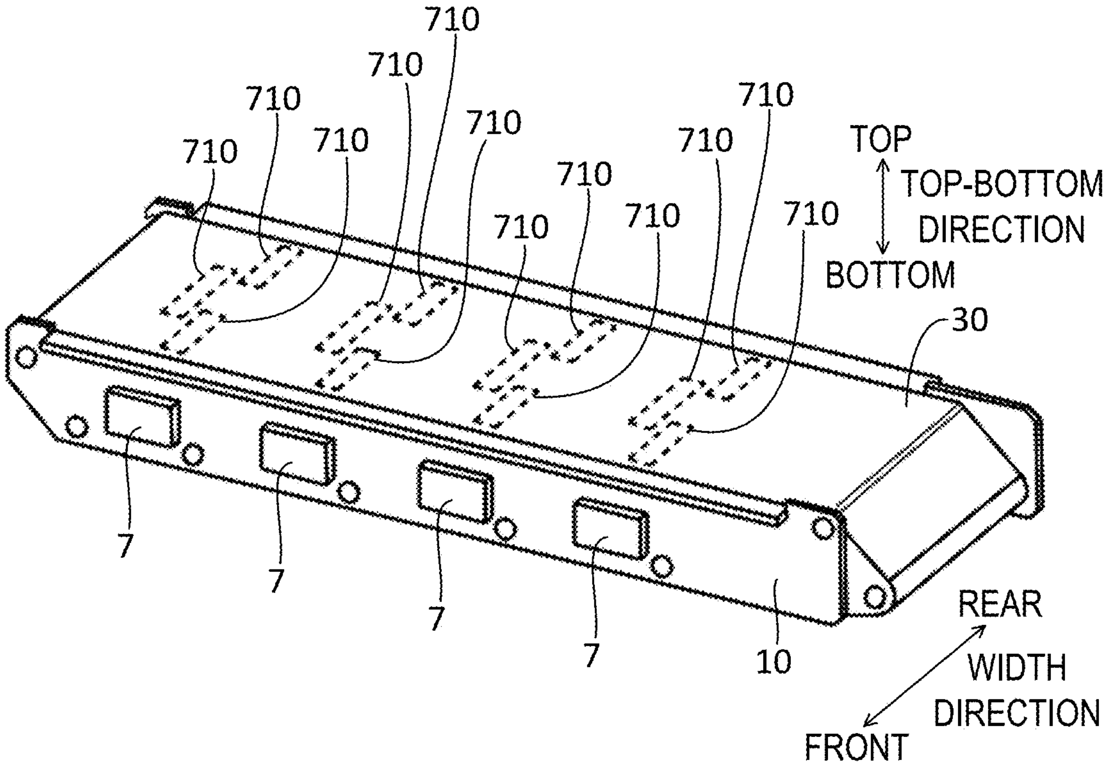
FIG. 6 is a schematic perspective view of the periphery of the conveyance belt of the inkjet recording apparatus according to one embodiment (showing a state where all waste ink containers are mounted)
Figure 7:
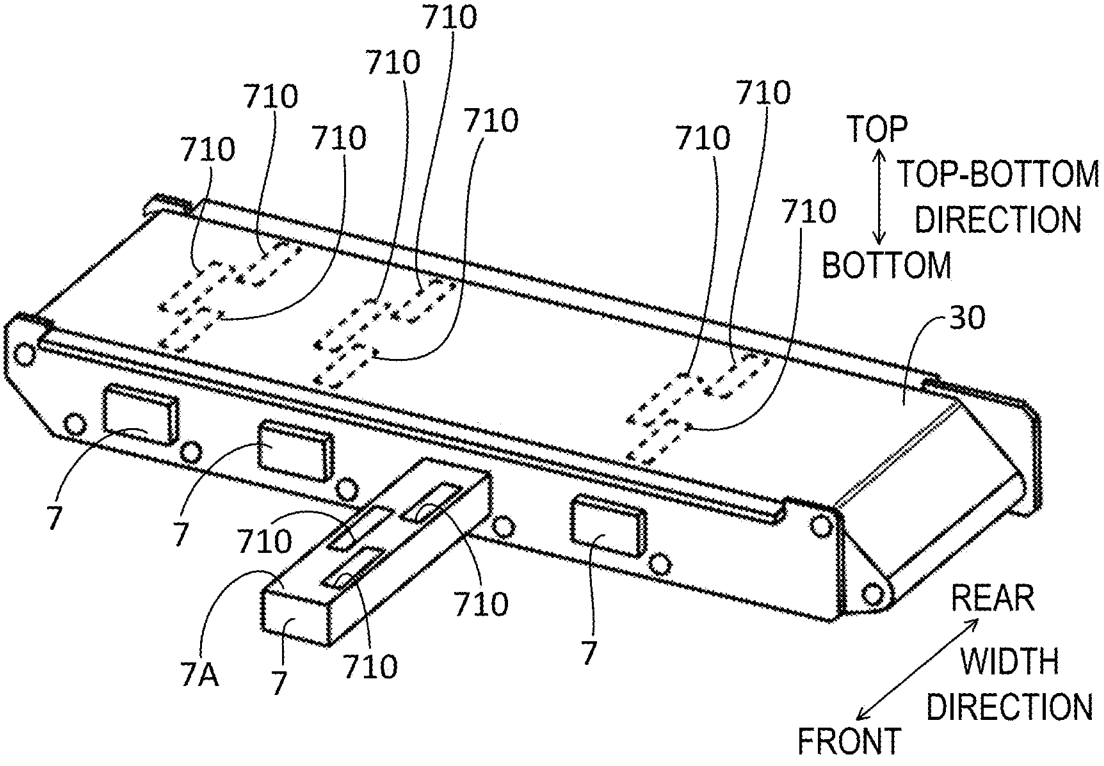
FIG. 7 is a schematic perspective view of the periphery of the conveyance belt of the inkjet recording apparatus according to one embodiment (showing a state where one of the waste ink containers is removed)

The suction mechanism 10 generates a suction airflow. The suction mechanism 10 is assigned individually to each waste ink container 7. Each suction mechanism 10 is connected to the corresponding waste ink container 7, and sucks the flushing ink from the corresponding recording head 40 into the reservoir region in the waste ink container 7. Sucking the flushing ink using the function of each suction mechanism 10 makes it possible to suppress contamination inside the apparatus to be caused by the flushing ink. In FIG. 5, a direction of sucking the flushing ink is represented by black arrows. Hollow arrows represent a direction of suction by the suction unit 300.

Each waste ink container 7 stores ink to be disposed of such as the flushing ink. The ink to be disposed of is ink discharged from the recording head 40 and not to be used for image recording. In other words, each waste ink container 7 stores the ink not to contribute to image recording. In the following description, for the sake of convenience, the ink to be disposed of including the flushing ink will generally be called flushing ink.

<Configuration of Waste Ink Container>

Attention will be focused on one waste ink container 7 and the configuration thereof will be described below by referring to FIGS. 8 and 9. Each waste ink container 7 has the same configuration each other. Thus, the following description will also be applied to the configurations of the other waste ink containers 7 and descriptions of these configurations will be omitted.

As viewed from the top-bottom direction (corresponding to the "certain direction"), the waste ink container 7 has a substantially rectangular shape extending short in one of horizontal directions perpendicular to the top-bottom direction and extending long in the other direction perpendicular to the one direction. Then, in the following description, of the horizontal directions perpendicular to the top-bottom direction, the one direction will be called a short-side direction DS and the other direction perpendicular to the one direction will be called a long-side direction DL. The short-side direction DS is a direction parallel to the conveyance direction DC in which the sheet S is conveyed by the conveyance belt 30. The long-side direction DL corresponds to the width direction of the conveyance belt 30 (a direction perpendicular to the rotation direction of the conveyance belt 30).

Note that FIGS. 8 and 9 referred to in the following description show the reservoir region in the waste ink container 7 schematically and do not show dimensions, shapes, etc. directly in an actual case. This also applies to FIG. 10.

The waste ink container 7 is a container like a rectangular parallelepiped. The waste ink container 7 has a ceiling section 7A, and a bottom section 7B facing the ceiling section 7A in the top-bottom direction. The waste ink container 7 has a side wall section 740 surrounding a region between the ceiling section 7A and the bottom section 7B from a lateral side (namely, from a direction perpendicular to the certain direction). The waste ink container 7 has an internal region surrounded by the ceiling section 7A, the bottom section 7B, and the side wall section 740 and having as the reservoir region for the flushing ink.

The side wall section 740 surrounds the reservoir region in the waste ink container 7 entirely as viewed from the top-bottom direction. In other words, the side wall section 740 covers the reservoir region in the waste ink container 7 entirely as viewed from the top-bottom direction. The waste ink container 7 has a rectangular shape as viewed from the top-bottom direction. Thus, the side wall section 740 has long-side wall sections 741 in a pair facing each other in the short-side direction DS across the reservoir region, and short-side wall sections 742 in a pair facing each other in the long-side direction DL across the reservoir region.

The waste ink container 7 (namely, the ceiling section 7A, the bottom section 7B, and the side wall section 740) is composed of a material impermeable to gas. The waste ink container 7 is composed of a material substantially impermeable to the flushing ink in a mist form (namely, gas containing the flushing ink). The waste ink container 7 has lower gas permeability than at least an absorbing member 8 described later. The waste ink container 7 is composed of sheet metal, for example. The waste ink container 7 may be composed of resin.

The waste ink container 7 has the absorbing member 8. The absorbing member 8 is located in the reservoir region in the waste ink container 7. The absorbing member 8 is a porous member to absorb the flushing ink. Melamine sponge is available as a constituting material for the absorbing member 8. The absorbing member 8 absorbs the flushing ink and retains the flushing ink therein.

The waste ink container 7 includes a suction air passage 70 formed in the reservoir region and used for causing the suction airflow to pass therethrough generated in response to driving of the suction mechanism 10. The suction air passage 70 includes a plurality of the suction air passages 70. The suction air passage 70 is defined by space in the reservoir region in the waste ink container 7 where the absorbing member 8 is absent (namely, by a gap in the reservoir region). For example, the suction air passage 70 is space obtained by making a partial cutout from the absorbing member 8. In other words, the suction air passage 70 is space surrounded by the absorbing member 8.

The ceiling section 7A functions as an ink receiver to receive the flushing ink sucked by the suction mechanism 10. Specifically, the ceiling section 7A has a receiving opening 710 of a rectangular shape penetrating the ceiling section 7A in the top-bottom direction. The receiving opening 710 includes a plurality of the receiving openings 710. Note that the receiving opening 710 is opened upward. In other words, a direction in which the receiving opening 710 is opened is the top-bottom direction.

The receiving opening 710 is assigned individually to each recording head 40. If there are three recording heads 40, three receiving openings 710 are provided. Each receiving opening 710 faces the corresponding recording head 40 across the conveyance belt 30 (namely, the conveyance path of the sheet S) in the top-bottom direction. For this reason, all the receiving openings 710 are spaced at intervals from each other as viewed from the top-bottom direction.

Each receiving opening 710 is an opening for collecting the flushing ink discharged from the corresponding recording head 40 into the reservoir region in the waste ink container 7. The flushing ink from each recording head 40 passes through the corresponding receiving opening 710 to reach the reservoir region in the waste ink container 7.

A circular cylindrical duct 731 is provided in the reservoir region in the waste ink container 7. A cylindrical axis of the duct 731 extends in the top-bottom direction. The duct 731 has an opening at one end side thereof in the top-bottom direction functioning as a suction opening 730. In other words, the waste ink container 7 has the suction opening 730.

The bottom section 7B has a connection opening (a sign thereof is omitted) penetrating the bottom section 7B in the top-bottom direction. The duct 731 extends upward in a circular cylindrical shape from an edge of the connection opening of the bottom section 7B. The suction mechanism 10 is located outside the waste ink container 7 and is connected to the connection opening at the bottom section 7B. In other words, the suction mechanism 10 is connected to the duct 731. The duct 731 may be obtained by forming a hole penetrating a part of the absorbing member 8 in the top-bottom direction. In other words, the duct 731 may be a pipe material provided in this hole.

The suction air passage 70 is assigned individually to each of the three receiving openings 710. In other words, the waste ink container 7 includes the three suction air passages 70 connected to each of the three receiving openings 710. Each of the three suction air passages 70 forms communication between the receiving opening 710 as a connection destination and the suction opening 730. In FIG. 8, all the three receiving openings 710 are respectively represented by dashed lines. The suction opening 730 is located at a position spaced at an interval from each of the three receiving openings 710 as viewed from the top-bottom direction.

As viewed from the top-bottom direction, one receiving opening 710 of the three receiving openings 710 is spaced at an interval in the short-side direction DS from the suction opening 730. As viewed from the top-bottom direction, this receiving opening 710 is located in a central area of the waste ink container 7 (specifically, the ceiling section 7A) in the long-side direction DL. In the following description, the one receiving opening 710 will be called a center receiving opening 711. An opening shape of the center receiving opening 711 viewed from the top-bottom direction is a substantially rectangular shape extending in the long-side direction DL as a long-side direction thereof.

As viewed from the top-bottom direction, the other two receiving openings 710 of the three receiving openings 710 different from the center receiving opening 711 are spaced at an interval therebetween in the long-side direction DL across the suction opening 730. One of these two receiving openings 710 is located on a rear side (one side in the width direction) and the other is located on a front side (the other side in the width direction). In the following description, one of these two receiving openings 710 will be called a rear-side receiving opening 712 and the other will be called a front-side receiving opening 713. An opening shape of each of the rear-side receiving opening 712 and the front-side receiving opening 713 viewed from the top-bottom direction is a substantially rectangular shape extending in the long-side direction DL as a long-side direction thereof.

In the following description, to distinguish the plurality of suction air passages 70 from each other, the suction air passage 70 connected to the center receiving opening 711 may be given a sign 71, the suction air passage 70 connected to the rear-side receiving opening 712 may be given a sign 72, and the suction air passage 70 connected to the front-side receiving opening 713 may be given a sign 73.

<Shape of Suction Air Passage>

The suction airflow contains mist of the flushing ink. If the flushing ink in a mist form leaks out via the suction opening 730, inconvenience such as contamination inside the printer 100 is caused. To reduce the occurrence of such inconvenience, it is necessary to separate gas flowing in the suction air passage 70 (namely, gas sucked by the suction mechanism 10) and the flushing ink favorably from each other in the reservoir region in the waste ink container 7 to absorb the flushing ink in the absorbing member 8. In other words, it is necessary to increase efficiency in collecting the flushing ink in the reservoir region in the waste ink container 7.

To increase efficiency in collecting the flushing ink in the reservoir region in the waste ink container 7, an inner wall of each suction air passage 70 is defined by the absorbing member 8. In this configuration, efficiency in collecting the flushing ink is increased by absorbing the flushing ink in the absorbing member 8. With more bends of each suction air passage 70, the flushing ink contained in gas flowing through each suction air passage 70 is separated more easily by centrifugal force, thereby increasing efficiency in collecting the flushing ink.

Figure 8:
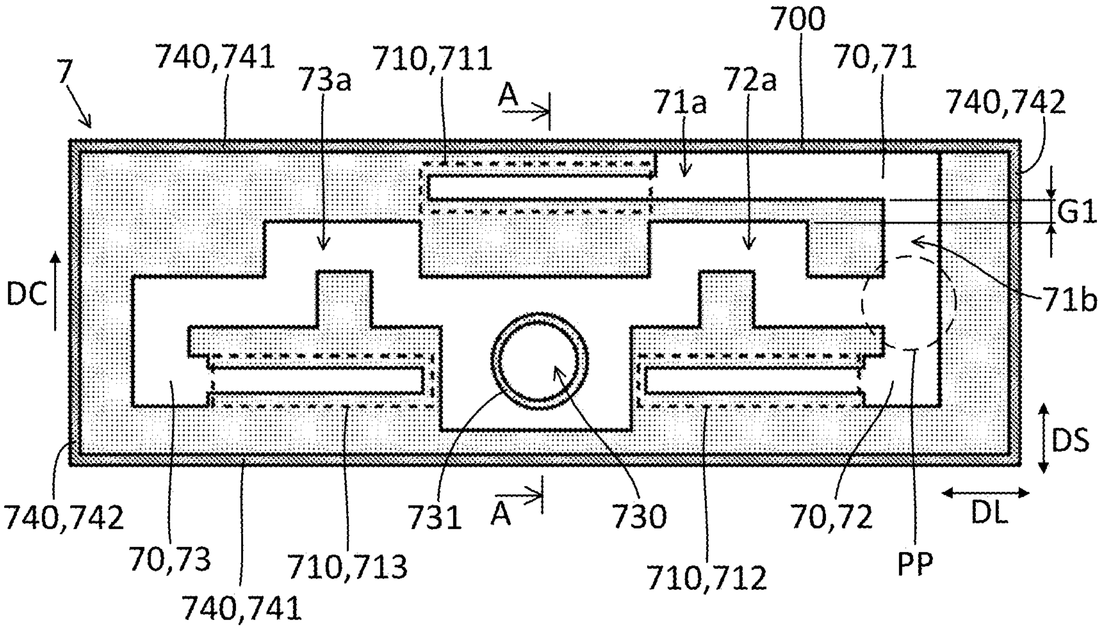
FIG. 8 is a schematic view showing a reservoir region in the waste ink container of the inkjet recording apparatus according to one embodiment.
Figure 9:
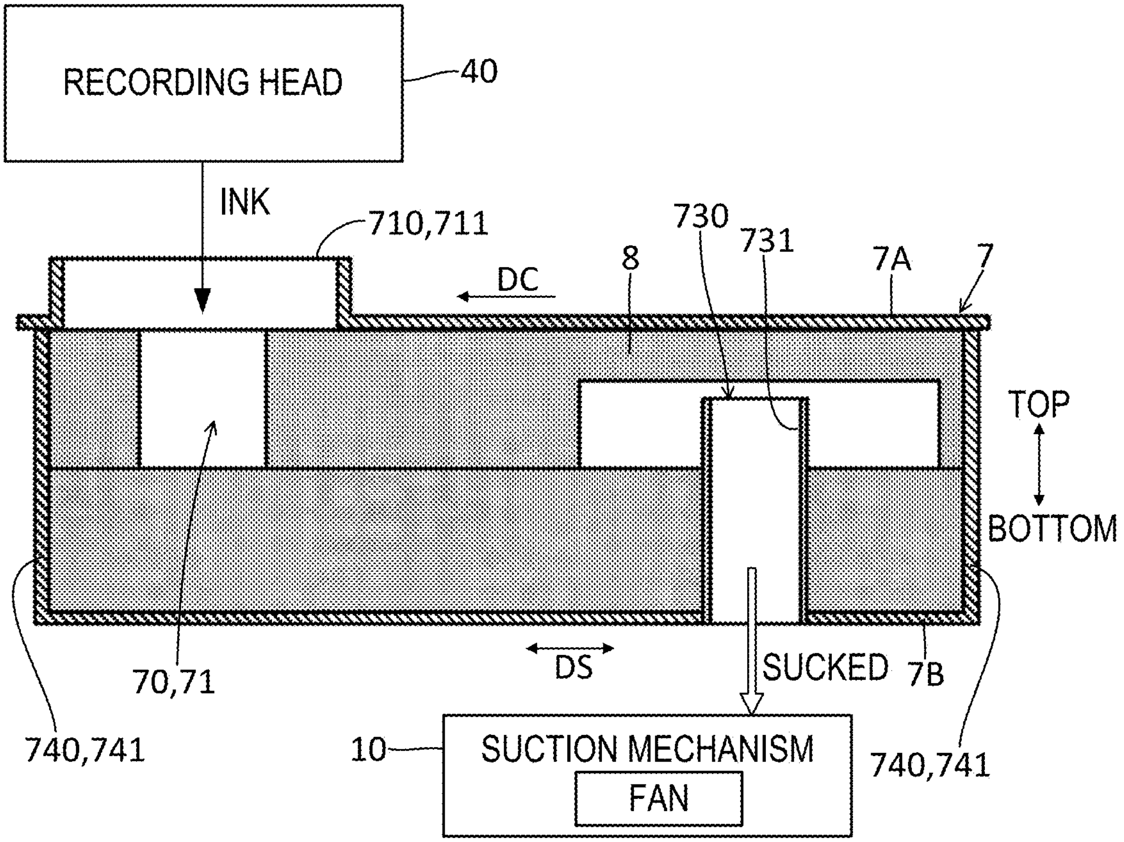
FIG. 9 is a schematic view corresponding to a section taken along a line A-A shown in FIG. 8.

To increase efficiency in collecting the flushing ink, each of the plurality of suction air passages 70 has a shape shown in FIG. 8 as viewed from the top-bottom direction. This will be described next in detail.

As viewed from the top-bottom direction, each of the suction air passages 72 and 73 is bent several times in an area from the receiving opening 710 as a connection destination (namely, from each of the rear-side receiving opening 712 and the front-side receiving opening 713) to the suction opening 730. As viewed from the top-bottom direction, each of the suction air passages 72 and 73 has a portion bent from the short-side direction DS to the long-side direction DL and a portion bent from the long-side direction DL to the short-side direction DS. As viewed from the top-bottom direction, the suction air passages 72 and 73 have a bent portion 72*a* and a bent portion 73*a* respectively each bent into a bellows shape. This facilitates separation of the flushing ink from gas in the suction air passages 72 and 73.

To also facilitate separation of the flushing ink from gas sucked via the center receiving opening 711, the suction air passage 71 is merged at a certain position PP with the suction air passage 72. This causes the gas sucked via the center receiving opening 711 to pass through the bent portion 72*a* of the suction air passage 72. As a result, the flushing ink is also separated easily from the gas sucked via the center receiving opening 711. While not shown in the drawings, the suction air passage 71 may be merged with the suction air passage 73.

As viewed from the top-bottom direction, the suction air passage 71 is extended from the center receiving opening 711 in the long-side direction DL and is bent from the long-side direction DL to the short-side direction DS, thereby merging the suction air passage 71 at the certain position PP with the suction air passage 72. Specifically, the suction air passage 71 has a long-side portion 71*a* extending in the long-side direction DL and a short-side portion 71*b* extending in the short-side direction DS. The short-side portion 71*b* of the suction air passage 71 is connected at the certain position PP to the suction air passage 72. In FIG. 8, the certain position PP is surrounded by a dashed circle (this also applies to FIG. 10).

As viewed from the top-bottom direction, the long-side portion 71*a* of the suction air passage 71 is spaced at an interval G1 in the short-side direction DS from the bent portion 72*a* of the suction air passage 72. The long-side portion 71*a* is located on a downstream side (one side in the short-side direction DS) from the bent portion 72*a* in the conveyance direction DC of the sheet S. In other words, the bent portion 72*a* is located on an upstream side (the other side in the short-side direction DS) from the long-side portion 71*a* in the conveyance direction DC of the sheet S.

Figure 10:
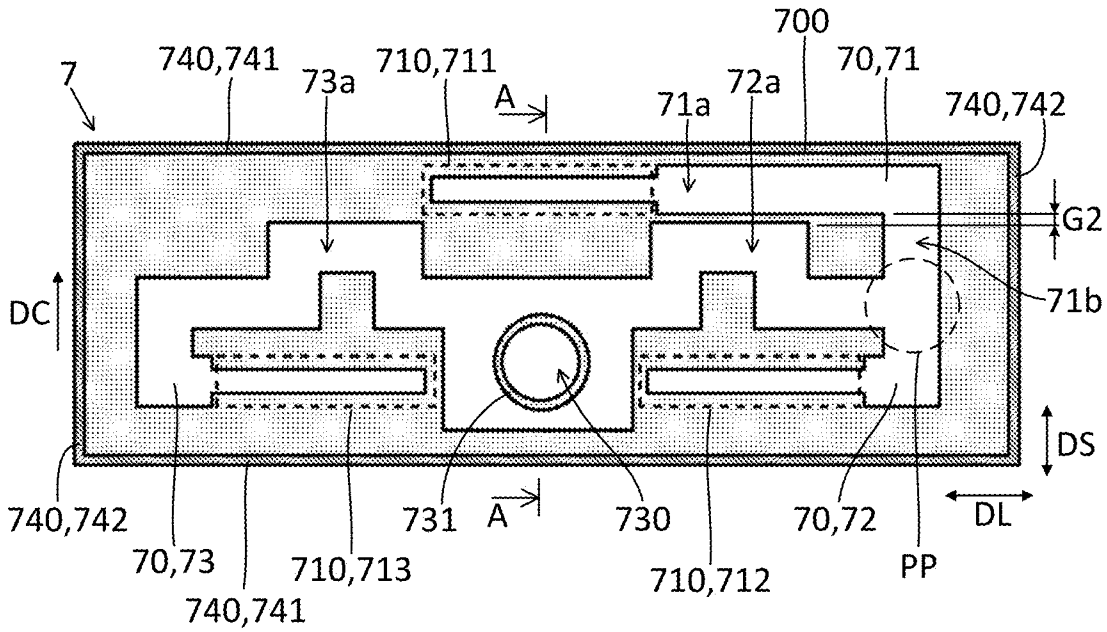
FIG. 10 is a view for explaining inconvenience occurring if a suction air passage is bent on a horizontal plane.

As shown in FIG. 10, in a conventional case, all partition walls of the plurality of suction air passages 70 are defined by the absorbing member 8. In the illustration in FIG. 10, the long-side portion 71*a* of the suction air passage 71 interferes with the bent portion 72*a* of the suction air passage 72. Specifically, as viewed from the top-bottom direction, an interval G2 in the short-side direction DS between the long-side portion 71*a* and the bent portion 72*a* is excessively small. This results in the occurrence of inconvenience such as breakage of a partition wall between the long-side portion 71*a* and the bent portion 72*a*. The excessively small interval G2 itself causes inconvenience of failing to use the absorbing member 8 for manufacture.

As viewed from the top-bottom direction, each suction air passage 70 is formed at a position that depends on the position of the receiving opening 710 as a connection destination in the horizontal direction (namely, the position of the corresponding recording head 40 in the horizontal direction). For this reason, it is difficult to take a countermeasure of largely changing the forming position of each suction air passage 70 as viewed from the top-bottom direction for a purpose of reducing the occurrence of the foregoing inconvenience.

The foregoing inconvenience may be solved by a method of further reducing an air passage diameter of the suction air passage 71 (in the illustration in FIG. 10, the width of the long-side portion 71*a* in the short-side direction DS). However, further reducing the air passage diameter of the suction air passage 71 causes another inconvenience that a suction force at the center receiving opening 711 to which the suction air passage 71 is connected becomes lower than those at the other receiving openings 710.

The foregoing inconvenience might be solved by a method of shifting a forming position of the long-side portion 71*a* of the suction air passage 71 in a direction of getting away from the bent portion 72*a* of the suction air passage 72 (namely, in one direction of the short-side direction DS) without reducing the air passage diameter of the suction air passage 71. In this case, however, of the partition walls defined by the absorbing member 8, a partition wall on the side of the side wall section 740 is required to be extremely thin while the thickness of the partition wall in the short-side direction DS between the long-side portion 71*a* and the bent portion 72*a* is ensured, thereby imposing difficulty in using the absorbing member 8 for manufacture.

In this regard, the side wall section 740 includes an air passage doubling portion 700. While the air passage doubling portion 700 forms a part of the side wall section 740, it further functions as a partition wall between the plurality of suction air passages 70. The air passage doubling portion 700 functions as a partition wall of the long-side portion 71*a* of the suction air passage 71.

Specifically, in the present embodiment, the long-side portion 71*a* of the suction air passage 71 is defined by space sandwiched between the air passage doubling portion 700 and the absorbing member 8. As viewed from the top-bottom direction, a part of the partition wall of the long-side portion 71*a* on the one side in the short-side direction DS (namely, on the downstream side in the conveyance direction DC of the sheet S) is defined by the air passage doubling portion 700, and a part of this partition wall on the other side in the short-side direction DS (namely, on the upstream side in the conveyance direction DC of the sheet S) is defined by the absorbing member 8. In other words, the waste ink container 7 has a portion of the side wall section 740 covering the reservoir region in the waste ink container 7 itself from the downstream side in the conveyance direction DC of the sheet S and functioning as the air passage doubling portion 700.

By doing so, while the countermeasure is taken by which the forming position of the long-side portion 71*a* of the suction air passage 71 is shifted in the direction of getting away from the bent portion 72*a* of the suction air passage 72 without reducing the air passage diameter of the suction air passage 71, it becomes unnecessary to make a part of the absorbing member 8 extremely thin. Shifting the forming position of the long-side portion 71*a* of the suction air passage 71 in the direction of getting away from the bent portion 72*a* of the suction air passage 72 allows the suction air passage 71 to be merged with the suction air passage 72 without causing interference of the long-side portion 71*a* with the bent portion 72*a*.

If the suction air passage 71 is merged with the suction air passage 72, gas sucked via the center receiving opening 711 (the sucked gas contains the flushing ink in a mist form) flows in the suction air passage 72. The gas flowing in the suction air passage 72 passes through the bent portion 72*a*. By doing so, the flushing ink is separated favorably from the gas sucked via the center receiving opening 711.

As a result, efficiency in collecting the flushing ink in the reservoir region in the waste ink container 7 is increased. Furthermore, leakage of the flushing ink from the waste ink container 7 is suppressed. Suppressing leakage of the flushing ink from the waste ink container 7 reduces the occurrence of inconvenience such as contamination inside the apparatus (contamination of the suction mechanism 10, for example) with the flushing ink.

If efficiency in collecting the flushing ink in the reservoir region in the waste ink container 7 is increased, the flushing ink to reach as far as the suction mechanism 10 is reduced. This allows reduction in the occurrence of failure of a fan. Reducing the flushing ink to reach as far as the suction mechanism 10 further makes it possible to reduce a frequency of change of a filter provided at the fan.

In the illustration in FIG. 10, interference between the suction air passage 71 and the suction air passage 72 might be suppressed by a method of connecting the suction air passage 71 directly to the suction opening 730 (namely, extending the suction air passage 71 in the short-side direction DS from the center receiving opening 711). However, as a result of the absence of a bend at the suction air passage 71, this makes it impossible to separate the flushing ink efficiently from gas in the suction air passage 71.

On the other hand, in the present embodiment, while interference between the plurality of suction air passages 70 is avoided, it is possible to increase the number of bends at each of these suction air passages 70.

Forming the long-side portion 71*a* of the suction air passage 71 using the space sandwiched between the absorbing member 8 and the air passage doubling portion 700 eliminates the need for reducing an air passage diameter of the long-side portion 71*a*. This makes it possible to suppress reduction in suction force at the center receiving opening 711. In other words, it becomes possible to reduce the occurrence of a large difference between each suction force at the plurality of receiving openings 710.

As an example, the occurrence of reduction in suction force at any portion of the plurality of receiving openings 710 may result in insufficient suction of the sheet S at this portion. This may make the sheet S float upward to cause inconvenience of collision of the sheet S with the recording head 40. Additionally, at the portion of the plurality of receiving openings 710 where the suction force reduction has occurred, the flushing ink may not be sucked sufficiently. This may cause inconvenience of contamination inside the apparatus with the flushing ink. Furthermore, if a suction force is larger at any portion of the plurality of receiving openings 710 than at the other portions, ink may be flowed by the suction force at this portion to cause deviation of a landing position of the ink on the sheet S. This may cause inconvenience of image quality reduction.

On the other hand, in the present embodiment, a large difference is not generated between each suction force at the plurality of receiving openings 710, making it possible to reduce the occurrences of upward floating of the sheet S, contamination inside the apparatus, image quality reduction, and others.

As modifications, while not shown in the drawings, a portion corresponding to a "certain portion" may be provided at the suction air passage 72 or at the suction air passage 73. In other words, a part of the suction air passage 72 may be defined by space sandwiched between the absorbing member 8 and the side wall section 740. In this case, a portion of the side wall section 740 defining the part of the suction air passage 72 corresponds to an "air passage doubling portion." In another case, a part of the suction air passage 73 may be defined by space sandwiched between the absorbing member 8 and the side wall section 740. In this case, a portion of the side wall section 740 defining the part of the suction air passage 73 corresponds to the "air passage doubling portion."

Note that the suction airflow further flows in space extending around the suction opening 730 in which the suction air passage 72 and the suction air passage 73 are merged with each other (here, this space is called a merging chamber). In other words, the merging chamber also forms a part of the suction air passage. In this configuration, space sandwiched between the absorbing member 8 and the side wall section 740 may be used as the merging chamber. In other words, a part of the merging chamber may correspond to the "certain portion."

In the present embodiment, as viewed from the top-bottom direction, the suction air passage 72 is located on an opposite side to the air passage doubling portion 700 with respect to the long-side portion 71*a* of the suction air passage 71. As viewed from the top-bottom direction, the bent portion 72*a* of the suction air passage 72 is bent in a bellows shape to project toward the long-side portion 71*a* of the suction air passage 71. In this configuration, shifting the forming position of the long-side portion 71*a* of the suction air passage 71 in the direction of getting away from the bent portion 72*a* of the suction air passage 72 makes it possible to avoid interference between the long-side portion 71*a* and the bent portion 72*a*.

The present embodiment has a configuration with the plurality of waste ink containers 7 spaced at an interval therebetween in the conveyance direction DC of the sheet S. In this configuration, it is difficult to increase the size of the waste ink container 7 in the short-side direction DS. In response to this, the long-side portion 71*a* of the suction air passage 71 is defined by the space sandwiched between the absorbing member 8 and the air passage doubling portion 700. By doing so, it becomes possible to shift the forming position of the long-side portion 71*a* of the suction air passage 71 in the direction of getting away from the bent portion 72*a* of the suction air passage 72 without increasing the size of the waste ink container 7 in the short-side direction DS.

In the present embodiment, the absorbing member 8 is located in the reservoir region in the waste ink container 7, and space without the absorbing member 8 in the reservoir region forms the plurality of suction air passages 70. Thus, it is possible to increase efficiency in collecting the flushing ink easily. Meanwhile, a member lower in capability of absorbing ink than the absorbing member 8 or not to absorb the ink may be located in the reservoir region in the waste ink container 7 and this member may be used for forming the plurality of suction air passages 70.

It should be understood that the embodiment disclosed this time is illustrative in all aspects and not restrictive. The scope of the present disclosure is defined by the claims and not by the description of the embodiment given above, and covers all changes within meanings and ranges equivalent to those of the claims.

What is claimed is:

1. An inkjet recording apparatus comprising:

a recording head that records an image by discharging ink to a recording medium being conveyed;

a waste ink container located in such a manner as to face the recording head in a certain direction across a conveyance path of the recording medium, having a reservoir region therein, and storing the ink in the reservoir region, the stored ink being discharged from the recording head and not to be used for recording of the image; and a suction mechanism that sucks gas from the waste ink container, wherein the waste ink container includes:

a side wall section surrounding the reservoir region from a direction perpendicular to the certain direction;

a plurality of receiving openings for receiving the ink discharged from the recording head;

a suction opening located at a position spaced at an interval from each of the plurality of receiving openings as viewed from the certain direction and connected to the suction mechanism;

an absorbing member located in the reservoir region and absorbing the ink; and a plurality of suction air passages each defined by space in the reservoir region where the absorbing member is absent, connected to each of the plurality of receiving openings, and forming communication between the receiving opening as a connection destination and the suction opening to cause a suction airflow to pass therethrough generated in response to driving of the suction mechanism, and a certain portion of at least one of the suction air passages is defined by space sandwiched between an air passage doubling portion forming a part of the side wall section and the absorbing member.

2. The inkjet recording apparatus according to claim 1, wherein the suction air passage located on an opposite side to the air passage doubling portion with respect to the certain portion has a bent portion bent in a bellows shape to project toward the certain portion.

3. The inkjet recording apparatus according to claim 1, comprising:

a plurality of line heads each including the recording head and arranged in a conveyance direction of the recording medium, wherein the waste ink container is assigned individually to each of the plurality of line heads and located in such a manner as to face the line head to which the waste ink container is assigned across the conveyance path of the recording medium in the certain direction, and the waste ink container has a portion of the side wall section covering the reservoir region in the waste ink container itself from an upstream side or a downstream side in the conveyance direction and functioning as the air passage doubling portion.

* * * * *